(12) United States Patent
Sharma et al.

(10) Patent No.: US 10,354,225 B2
(45) Date of Patent: Jul. 16, 2019

(54) METHOD AND SYSTEM FOR PROCESS AUTOMATION IN COMPUTING

(71) Applicant: Tata Consultancy Services Limited, Mumbai (IN)

(72) Inventors: Sujata Sharma, Gandhinagar (IN); Sejal Deepak Dixit, Gandhinagar (IN); Vandana Patel, Gandhinagar (IN); Zuber Kamali, Gandhinagar (IN); Paridhi Agrawal, Gandhinagar (IN)

(73) Assignee: Tata Consultancy Services Limited, Mumbai (IN)

( * ) Notice: Subject to any disclaimer, the term of this patent is extended or adjusted under 35 U.S.C. 154(b) by 72 days.

(21) Appl. No.: 15/057,839

(22) Filed: Mar. 1, 2016

(65) Prior Publication Data
US 2017/0052824 A1 Feb. 23, 2017

(30) Foreign Application Priority Data
Aug. 19, 2015 (IN) .................................... 3154/2015

(51) Int. Cl.
| | |
|---|---|
| *G06Q 10/10* | (2012.01) |
| *G06F 9/451* | (2018.01) |
| *G06Q 10/06* | (2012.01) |
| *B25J 9/16* | (2006.01) |

(Continued)

(52) U.S. Cl.
CPC ............ *G06Q 10/10* (2013.01); *B25J 9/1656* (2013.01); *G06F 9/4494* (2018.02); *G06F 9/451* (2018.02); *G06F 9/453* (2018.02); *G06F 9/5044* (2013.01); *G06Q 10/06* (2013.01)

(58) Field of Classification Search
CPC .... G06F 9/5044; G06F 9/4443; B25J 9/1656; G06Q 10/06; G06Q 10/10
See application file for complete search history.

(56) References Cited

U.S. PATENT DOCUMENTS

| | | |
|---|---|---|
| 5,448,225 A | 9/1995 | Maignon et al. |
| 8,095,238 B2 | 1/2012 | Jones et al. |

(Continued)

FOREIGN PATENT DOCUMENTS

| | | |
|---|---|---|
| CN | 201156186 | 11/2008 |

*Primary Examiner* — Jacob D Dascomb
(74) *Attorney, Agent, or Firm* — Finnegan, Henderson, Farabow, Garrett & Dunner LLP

(57) ABSTRACT

The embodiments herein disclose a method and system for process automation in computing by implementing a Robotic Process Automation software arm component used for automation of tasks that involves transactional activities like reading from a document, application, writing into a system or application and so on. The process automation allows workflow generation for automation of business user activities on numerous operating systems and works with multiple platforms, environments and applications. Further, a process automation system also supports handling of runtime environment exceptions and audit log. A separate interface is not required by user for (easy) maintenance, as the interface supports admin configuration and run mode access. Internal/embedded documentation of process and unit level control on automation is supported while also supporting automating keyboard activities, mouse operations, wait/smart wait time feature, visual interaction and so on.

11 Claims, 26 Drawing Sheets

(51) Int. Cl.
  *G06F 9/50* (2006.01)
  *G06F 9/448* (2018.01)

(56) References Cited

U.S. PATENT DOCUMENTS

| | | | | |
|---|---|---|---|---|
| 2002/0156671 | A1* | 10/2002 | Libra | G06Q 10/06 705/7.15 |
| 2005/0234592 | A1 | 10/2005 | McGee et al. | |
| 2006/0005132 | A1* | 1/2006 | Herdeg, III | G06F 9/45512 715/704 |
| 2006/0184410 | A1* | 8/2006 | Ramamurthy | G06Q 10/10 706/8 |
| 2007/0288561 | A1* | 12/2007 | Beckhusen | G06Q 10/107 709/204 |
| 2008/0133210 | A1* | 6/2008 | Chagoly | G06F 11/3688 703/22 |
| 2010/0205530 | A1* | 8/2010 | Butin | G06F 9/4446 715/715 |
| 2014/0108583 | A1* | 4/2014 | Kulkarni | H04L 51/046 709/206 |

* cited by examiner

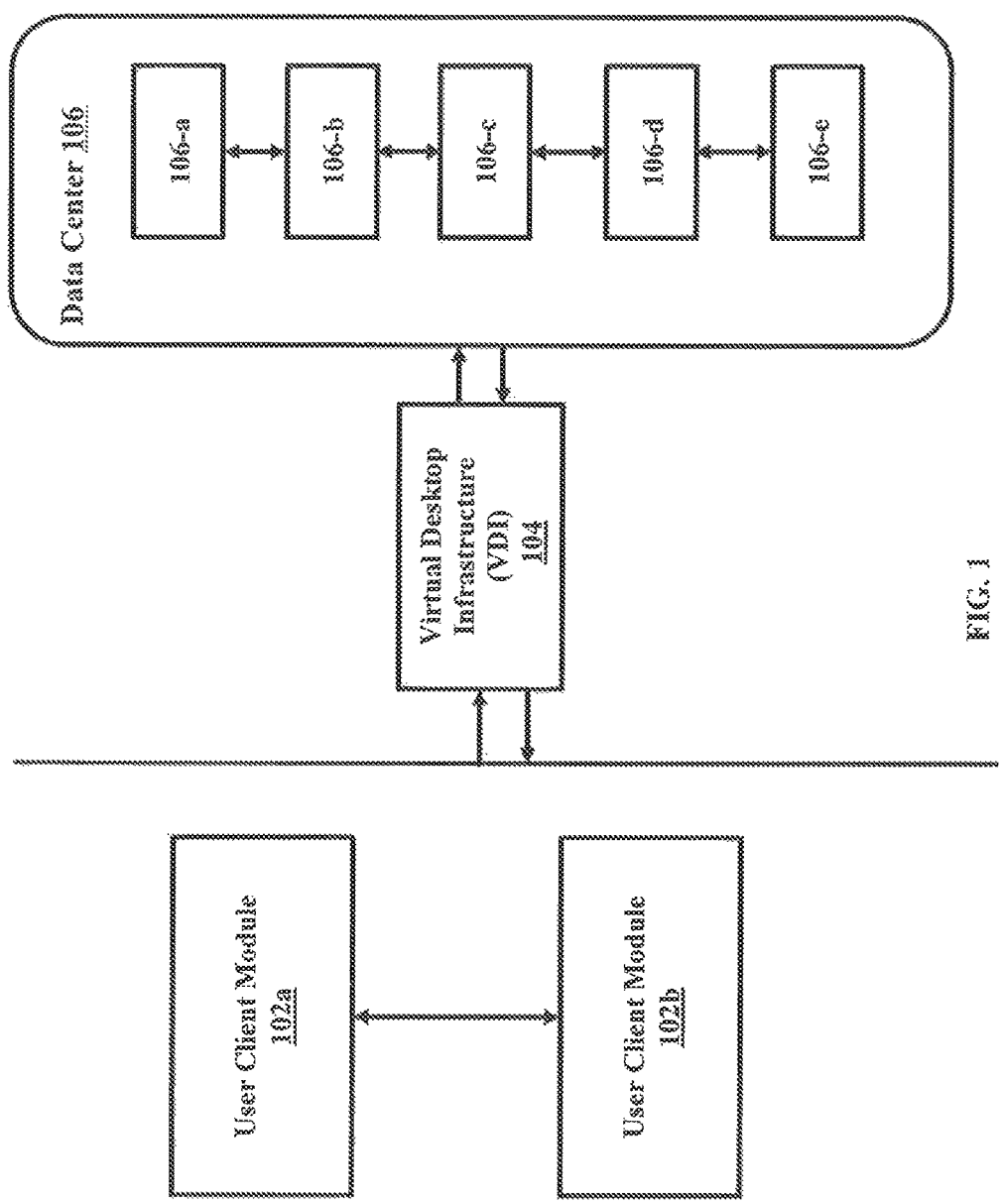

METHOD AND SYSTEM FOR PROCESS AUTOMATION IN COMPUTING

PRIORITY CLAIM

This U.S. patent application claims priority under 35 U.S.C. § 119 from Indian Patent Application No. 3154/MUM/2015, filed on Aug. 8, 2015, the entirety of which is hereby incorporated by reference.

TECHNICAL FIELD

The embodiments herein generally relate to process automation for content retrieval and execution, and, more particularly, to enabling process automation using a Robotic application component.

BACKGROUND

Users of computing devices usually work on multiple application programs to perform varieties of tasks. Some of these tasks are monotonous, repetitive, and mechanical in nature ultimately resulting in users spending considerable time and effort which adversely affects work productivity.

In order to aid users and reduce the burden on them, some kind of process automation is required and since such tasks usually require some amount of learning, Robotic process automation can be a preferred mode of automation. Robotic process automation allows automation of industrial and clerical processes and a robot uses application software in the same way as humans. Human personnel can train robots to perform a certain task or workflow in a short span of time.

Robotic process automation allows one to automate any series of computer tasks ranging from simply launching applications, checking email, moving or backing up files, keystroke recording, and so on. It is also possible to simulate or mimic mouse clicks and movement, keyboard key presses and other computer tasks easily using robotic automation software. In order to design a robotic automation software, one needs to collect sources of webpages, grab a webpage in Hyper Text Markup Language (HTML), find where the desired content is by analyzing the HTML tag and use a Java code for example to write the programming script.

At an operational level, existing robotic automation software applications can perform tasks such as simulating mouse actions, keyboard actions, replicate cut, copy, and paste features from one template to another, create scheduled tasks, undo and redo operations and so on. However, these operations are performed at an elementary level and require other pre-requisites for functioning such as a pre-defined template in a proper format to extract text and clearly outline the fields in which the text is to be pasted. Additionally, there is no transformation of data from one field to another and the robotic automation software's functionality is usually limited to be operational across a single platform.

Further, in existing techniques additional amount of configuration is required in order to create robotic automation tools which are then programmed to perform only limited functions and do not adequately and responsively function in case of scenarios such as network outage, virus attacks and so on. Additionally, existing and conventional techniques are currently not configured to identify application objects for certain platforms such as SAP® and CITRIX®. It is also difficult to achieve auto recording/self-learning of the transaction steps as well as trying to run a robotic ARM component at the backend of a computing system.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a computer implemented system for intelligently automating a plurality of computing tasks. The computer implemented system comprises a memory storing instructions, and a process automation system. Further, there is a hardware processor coupled to the memory, wherein the hardware processor is configured by the instructions to receive a plurality of data inputs, and the plurality of data inputs are segregated further wherein said plurality of data inputs mash up and transfer data from a first application screen to a second application screen, obtain a plurality of records based on said plurality of data inputs. Further, the process automation system obtains a first set of records from a first file to write the first set of records on an individual basis and subsequently skips to a second set of records wherein said first set of records are initially screened by the process automation system for dynamically and smartly selecting a target screen on said second application screen. Additionally, the computer implemented system applies a workflow generation mechanism based on said segregated plurality of data inputs to configure a plurality of specifications, wherein said workflow generation mechanism includes deciphering said first set of records on said second application screen to match an intended value field, and execute the plurality of specifications based on said plurality of data inputs, wherein said process automation system smartly waits for a specified period of time based on a set of incoming data to determine continuation and discontinuation of an execution of said plurality of specifications.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which:

FIG. 1 illustrates a schematic diagram depicting the computer architecture of a process automation system, according to the embodiments as disclosed herein;

DETAILED DESCRIPTION

Figure 2A:
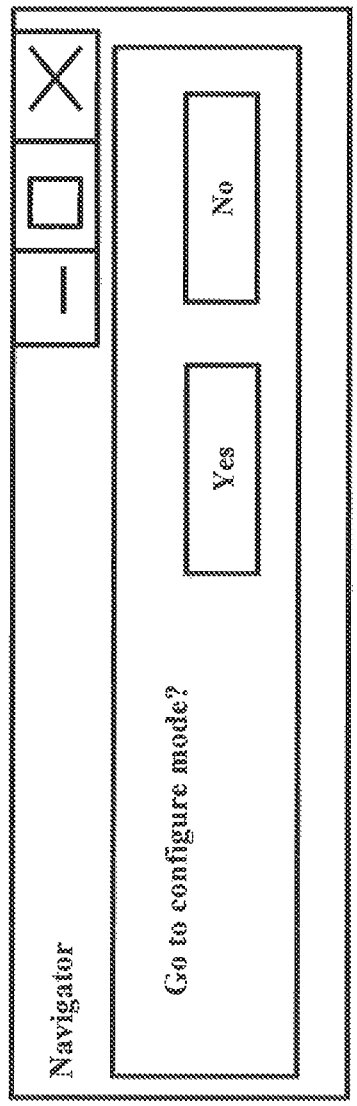
FIG. 2a to FIG. 2h depict various screenshots that appears on the screen of the process automation system, according to the embodiments as disclosed herein.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 illustrates a schematic diagram depicting the computer architecture of a process automation system 100, according to the embodiments as disclosed herein. As depicted in FIG. 1, a User client module 102a and a User client module 102b is connected via a Virtual desktop infrastructure (VDI) to a plurality of Data centers 106-a to 106-e. The process automation system 100 is designed to be a Robotic automation component that automates activities performed by a user on a computing device (not shown in Figure) that does not involve logical or decision making operations.

The process automation system 100 is capable of automating a plurality of activities such as copying and pasting data from one location to another location and listening to an activity on the screen of the computing device and subsequently replaying the same job. The process automation system 100 is configured to receive several data inputs such as a user defined input and then replay the same job and also mash up and transfer data from one application screen to another application screen.

The process automation system 100 automates copying and pasting from one application screen to another application screen in the desired field. In case the source files do not match to the required verifications and if there are a plurality of records selected, the process automation system 100 should obtain first few records from one file and then write them separately and skip to the next record.

It is also necessary to ensure that the process automation system 100 is reading and writing from the right sections or fields in a particular application. Since, the process automation system 100 does not use Document Object Model (DOM), it is of primary importance to ensure the right place to write in a target application screen. For example, a screen shot of a target area can be selected from the target screen and then deciphered to match the screens to how an intended value should look like. For example, when data is captured from an excel sheet and the field is an invoice number it is then necessary to ensure that the invoice number is the target field of the application. In this case, tesseract (or any other OCR) captures the highlighted area in the application, deciphers and compares with the intended value so that the caption of the field reads the invoice number.

In an embodiment, users may have to teach the process automation system 100 on how to reach the target record first. There may be a series of steps specified by the process automation system 100 to repeat and reach the target record. In case there are steps which require header processing and detail processing, then the header processing and detail processing can be performed separately but there may be a dependency from one step to another.

In another embodiment, the process automation system 100 is capable of running in non-UI mode (such as when a user Interface is not installed or supported in the operating system) during production runs while in a test run, it runs in a visual mode. The process automation system 100 works applying a principle of MECE (mutually exclusive but collectively exhaustive) components. These MECE components are connected to each other through web services where the web services component can be controlled by controller applications such as scheduler applications.

The process automation system 100 applies an approach of workflow generation to capture/configure certain specifications. The benefit of using the process automation system 100 is that it is auto-configurable and hence there is no requirement of coding.

The functionality of the process automation system 100 is divided into phases such as configuration phase and run phase. Configuration phase involves configuring each step in the automation of the process. For example, in order to perform a submit button click operation, the position of the submit button has to be captured and configured. Run phase executes a plurality of steps configured during the configuration phase. For example, for the submit button click configured in previous phases, a click operation is performed and the functionality related to the click operation is executed.

The functions performed by the process automation system 100 include but are not limited to:
 a) The process automation system 100 creates sections and steps for configuring each step.
 b) The process automation system 100 executes turk recording or any other execution file.
 c) The process automation system 100 handles run time environmental validations such as a virus pop up message, a CITRIX® disconnection and error message.
 d) The process automation system 100 replicates user actions performed using at least one of input interface, for example, a digital mouse and a keyboard.
 e) The process automation system 100 extracts text from multiple screens and also inputs data extracted previously from multiple screens in one or more screens.

f) The process automation system 100 automatically creates shortcuts for multiple recordings.

g) The process automation system 100 creates an error log for each automation run during batch processing.

h) The configurable steps in the process automation system 100 can be modified as several times as required without re-recording an entire operation.

Figure 2B:
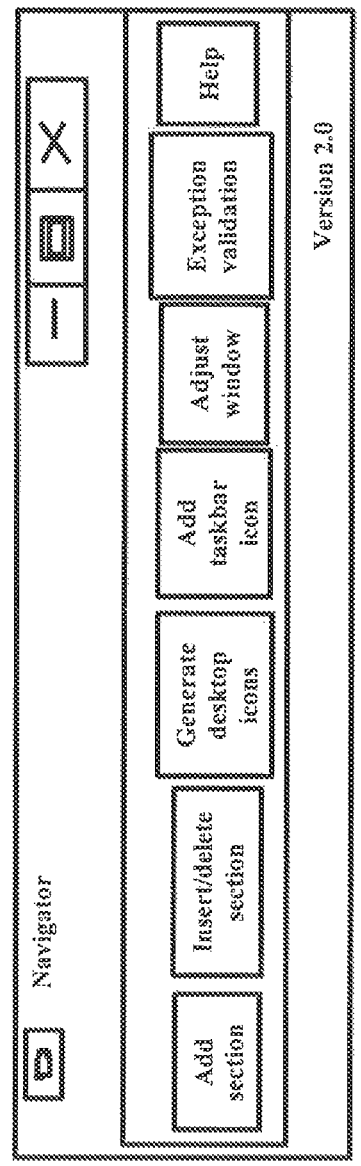
Figure 2C:
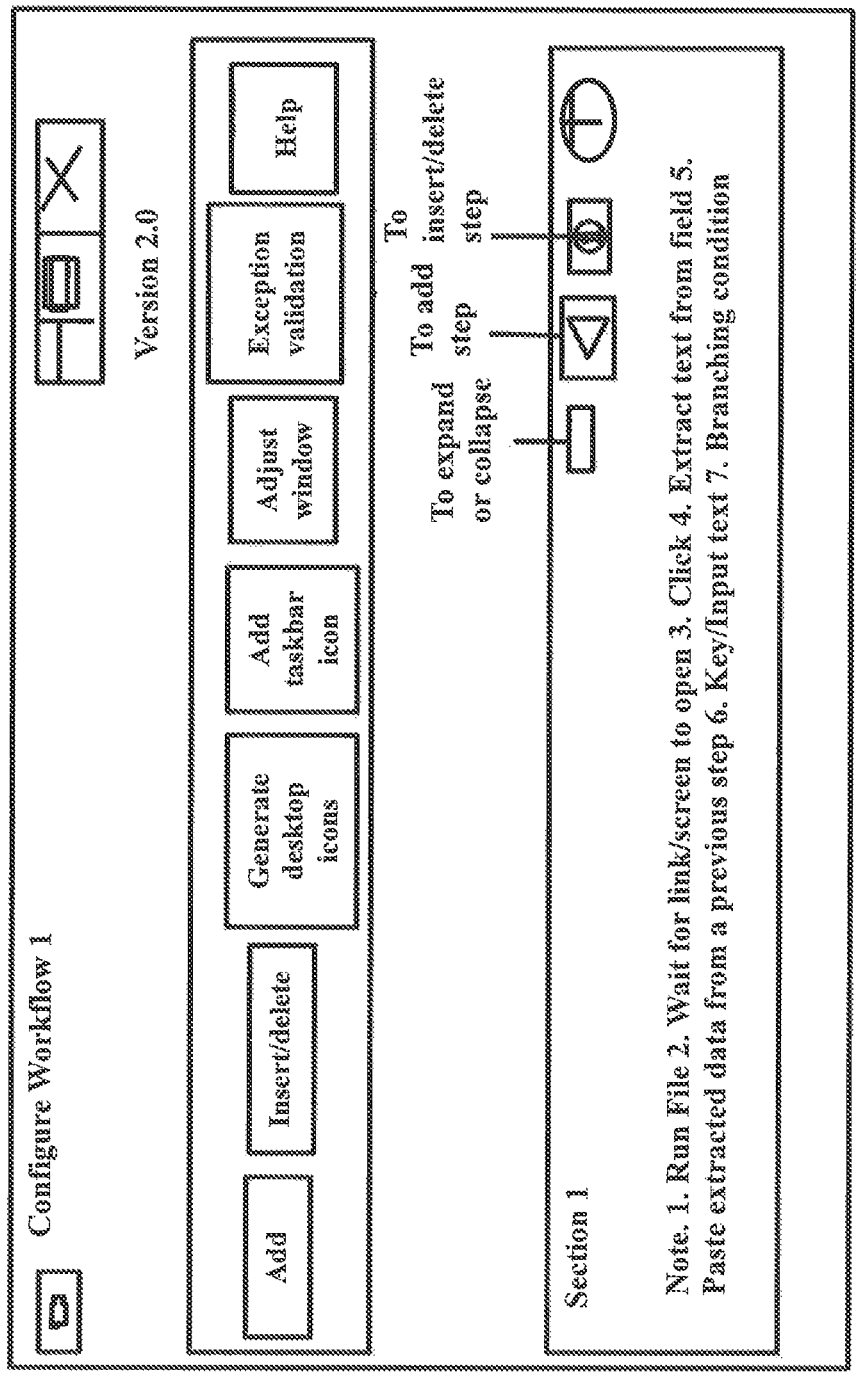

FIG. 2a to FIG. 2e depict various screenshots that appears on the screen of the process automation system 100, according to the embodiments as disclosed herein. FIG. 2a depicts a start-up screen on the process automation system 100. Initially, the process automation system 100 allows the user to configure or run the configuration. The user can click "Yes" to configure the steps of process to be automated or "No" to run configurations which are previously configured. As depicted in FIG. 2b, by clicking Yes in configure mode, the screen appears. FIG. 2c depicts an add section feature which allows users to create new steps and these add sections helps to logically group the steps section wise which can be enabled or disabled according to a requirement.

Figure 2D:
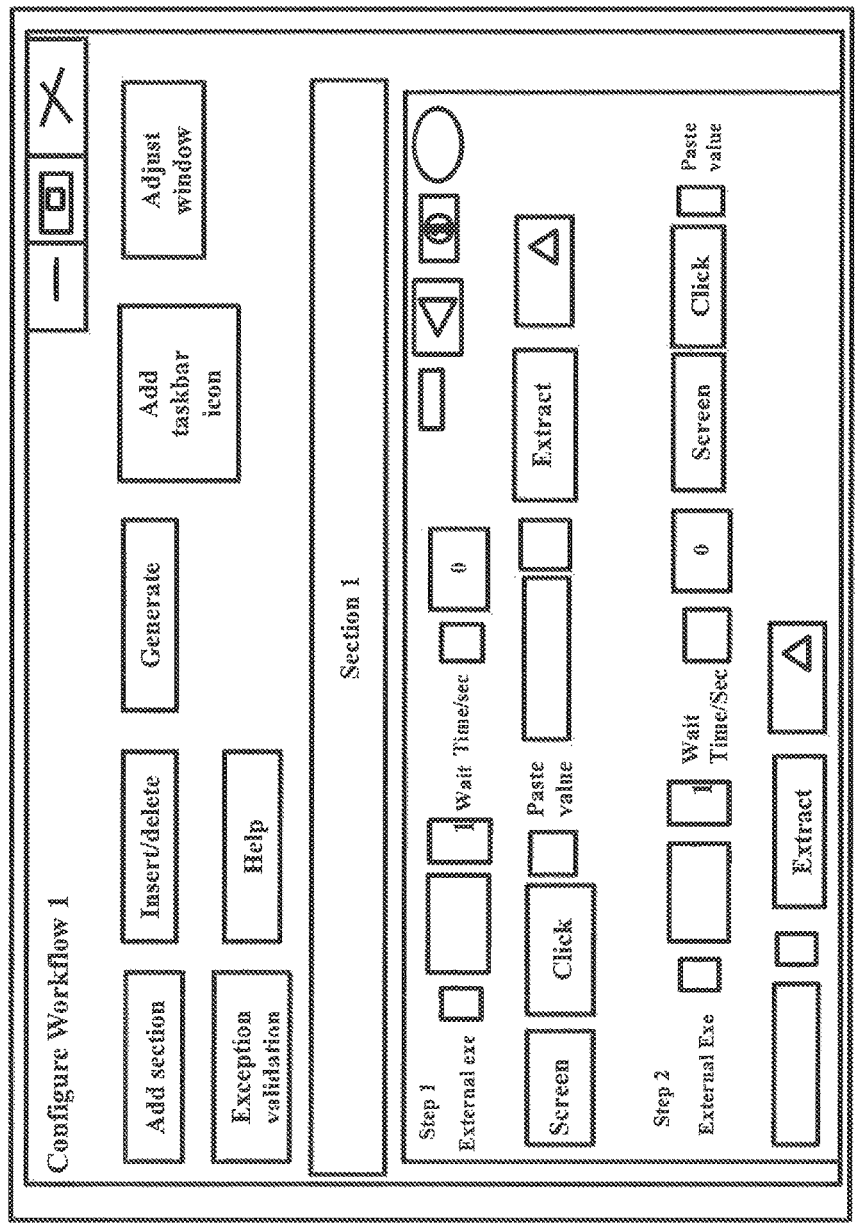
Figure 2E:
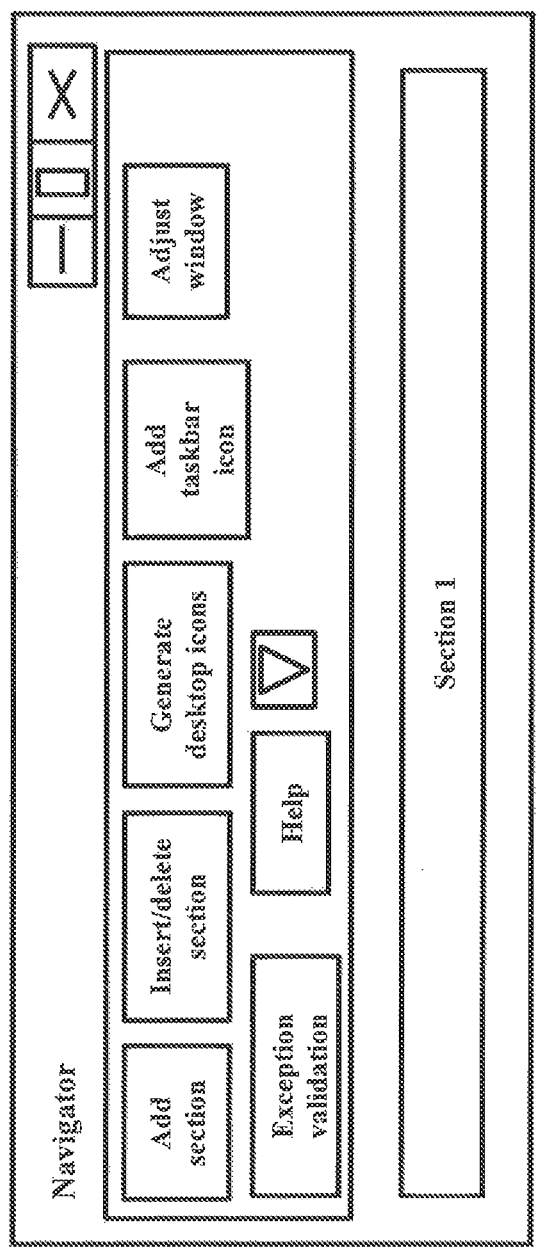

In an embodiment, FIG. 2d depicts an expanded section and FIG. 2e depicts a collapsed section wherein the add steps allows the user to add configuration steps one by one and the option of insert/delete steps makes the configuration user friendly by providing the user flexibility to insert or delete steps from any location.

Figure 2F:
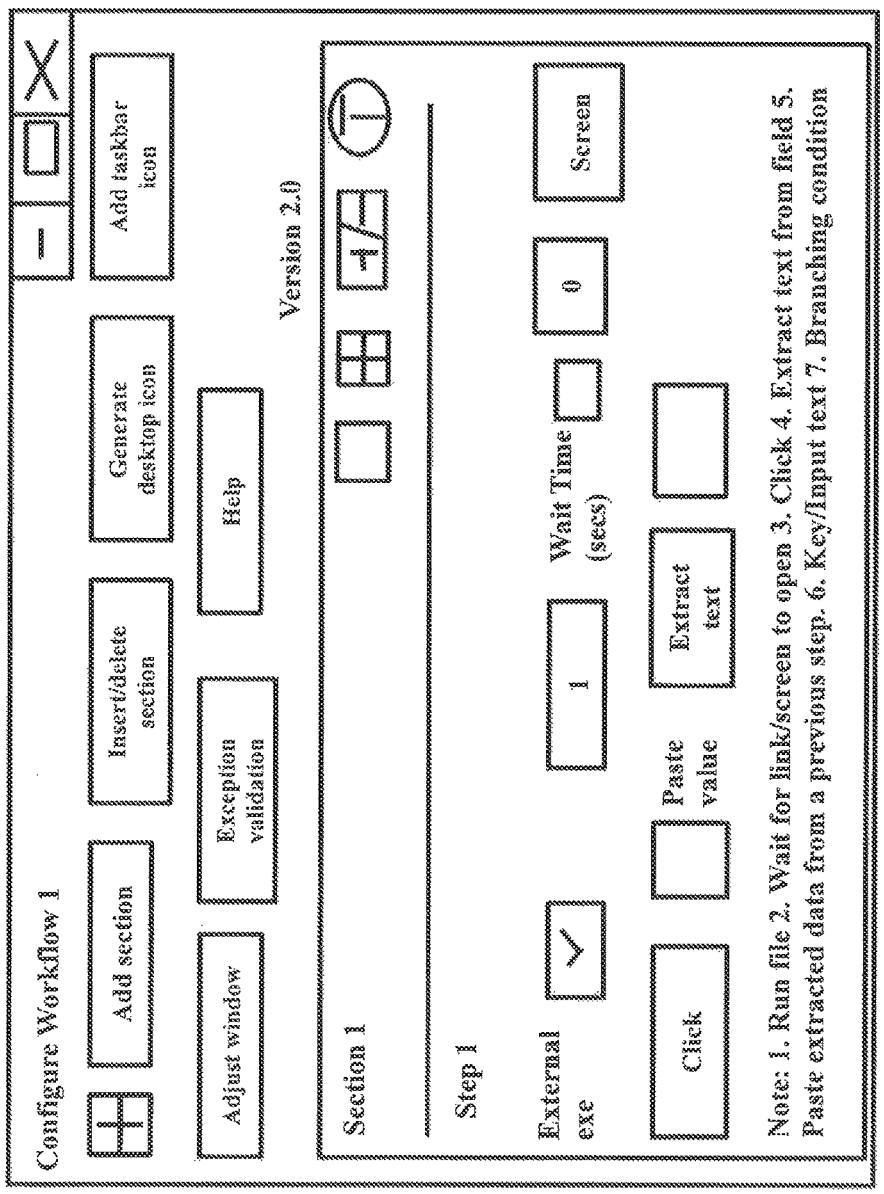
Figure 2G:
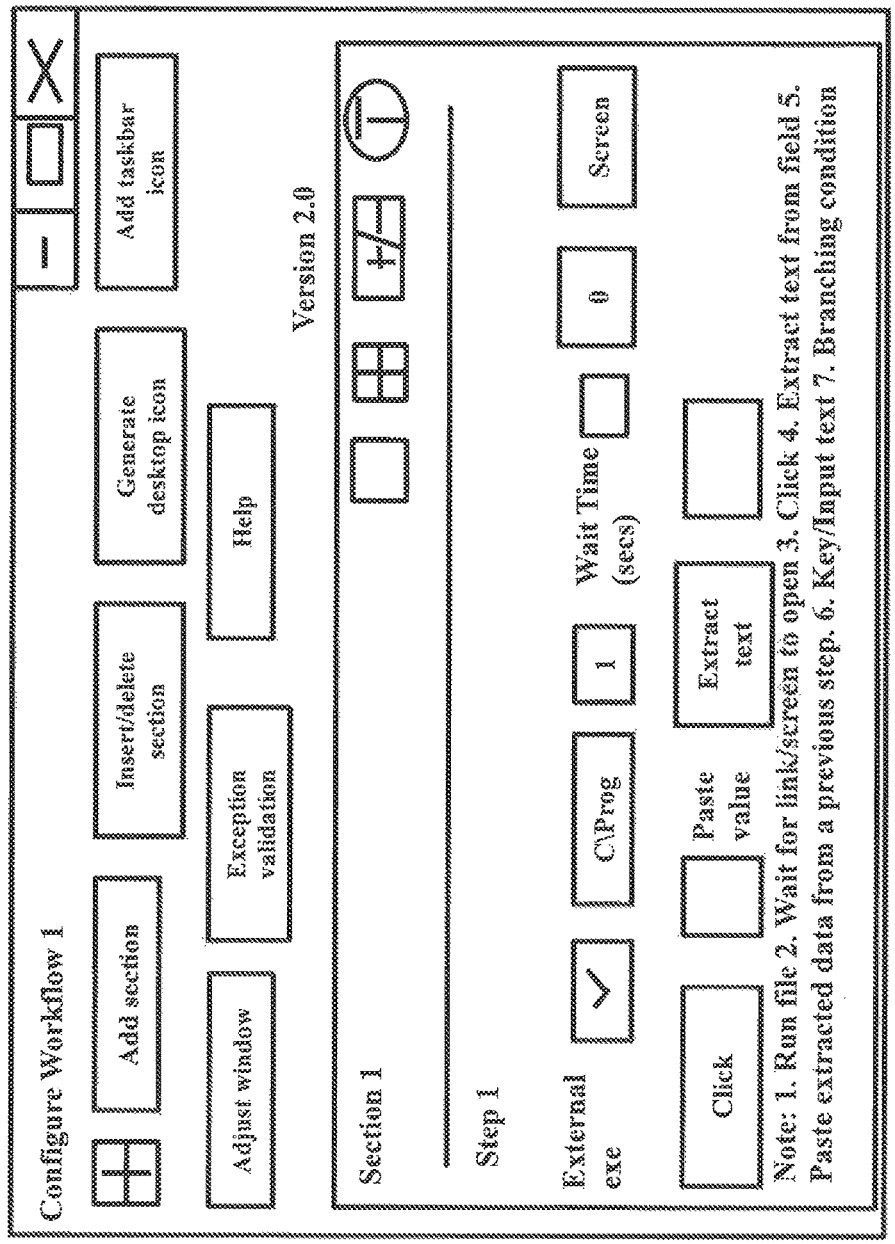
Figure 2H:
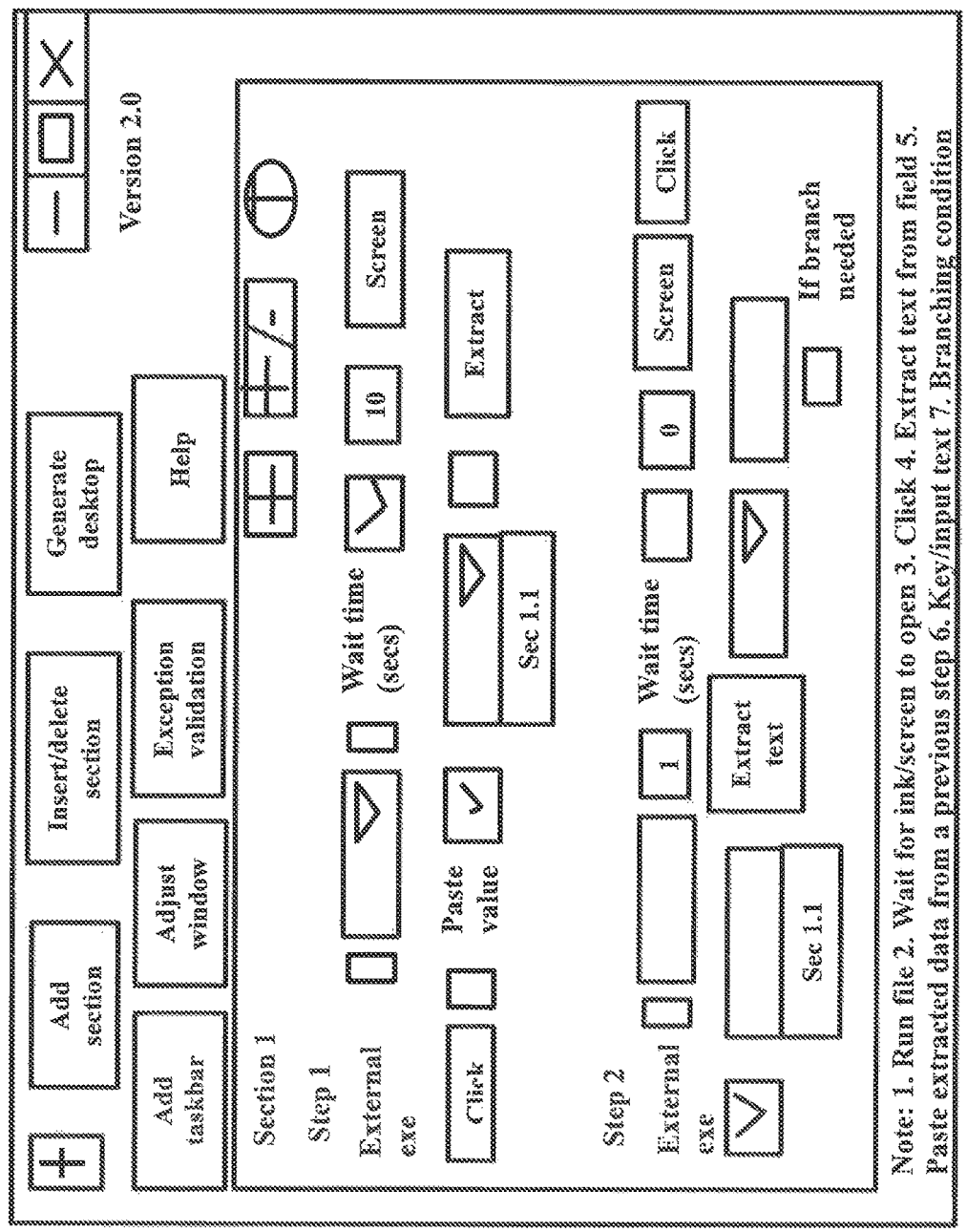

FIG. 2f through FIG. 2h allow users to add configuration steps one by one and the configuration is made user friendly by providing the user flexibility to insert or delete steps. As depicted in FIG. 2f, configuration options in add step are displayed wherein the comment textbox helps the users to write the comments about steps in configuration. The external execution in the process automation system 100 needs to perform a checklist mechanism mainly in the order of checking the checkbox during next external executable file, entering the location of executable file, and entering number of times the Executable file has to be executed.

For example, sufficient waiting time can be provided in the text box, so that the process automation system 100 waits until that time elapses while performing the operation and the operation time helps capturing the portion of screen. The click position button helps to configure click positions of either button or desktop icons. A value which is extracted through extracted field in previous steps can be pasted in any location using this option.

The extract field button extracts the data which falls or lies between co-ordinates captured by the user on clicking this button. This extracted text portion is displayed when a user clicks on show "extracted text button" and then the extracted portion can be pasted by using an option called "Refer branch section".

Figure 3A:
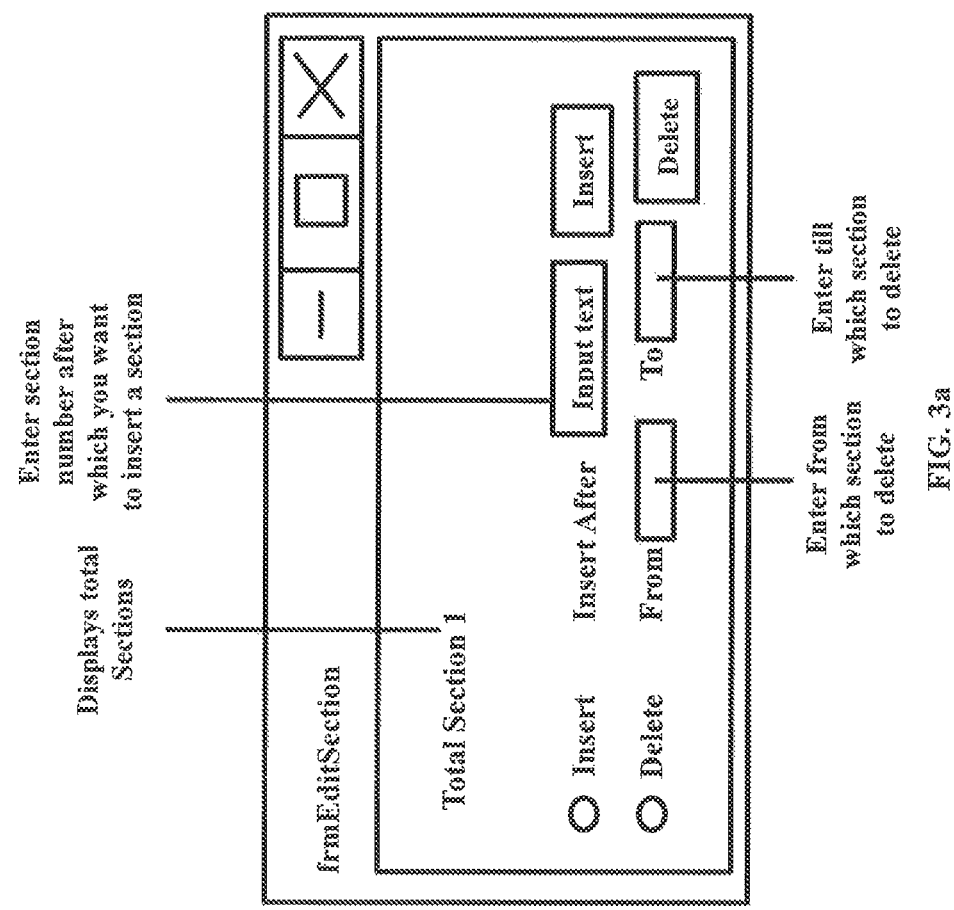
FIG. 3a depicts a screen shot to insert or edit steps in the process automation system, according to the embodiments as disclosed herein.

FIG. 3a depicts a screen shot to insert or edit steps in the process automation system 100 of FIG. 1, according to the embodiments as disclosed herein. As depicted in FIG. 3a, the configuration process facilitates displaying current section number and number of steps and to enter a step number while also providing an option to choose to enter from which step to delete, and until which step to delete. The extracted value from the steps of the section are displayed when clicked and certain sections can be disabled to prevent the execution of process during entire recording.

In an embodiment, an extract field button extracts data which falls between co-ordinates captured by the user on clicking this button. This extracted text is shown when the user clicks on the extracted text button. The extracted text button helps the user to send the commands such as "D click" (double click), "R click" (right click) and so on to the process automation system 100.

In an embodiment, the user can also send the text box to be pasted in any other location. The table below shows a list of commonly used commands.

| Commands | Description |
| --- | --- |
| DCLICK | To Double Click |
| RCLICK | To Right Click |
| % | Alter Key. |
| ^ | Control Key |
| + | Shift Key |
| {TAB} | Perform Tab Operation such as Navigate to next Control |
| {UP} | Performs Up Arrow Function. |
| {DOWN} | Performs Down Arrow Function. |
| {LEFT} | Performs Left Arrow Function. |
| {RIGHT} | Performs Right Arrow Function. |
| {ENTER} | Stimulate Keyboard Enter |
| {HOME} | HOME Key |
| {END} | END key |
| ^C | To Copy |
| ^v | To Paste |
| %{TAB} | Alt-Tab to Switch between programs |

Figure 3B:
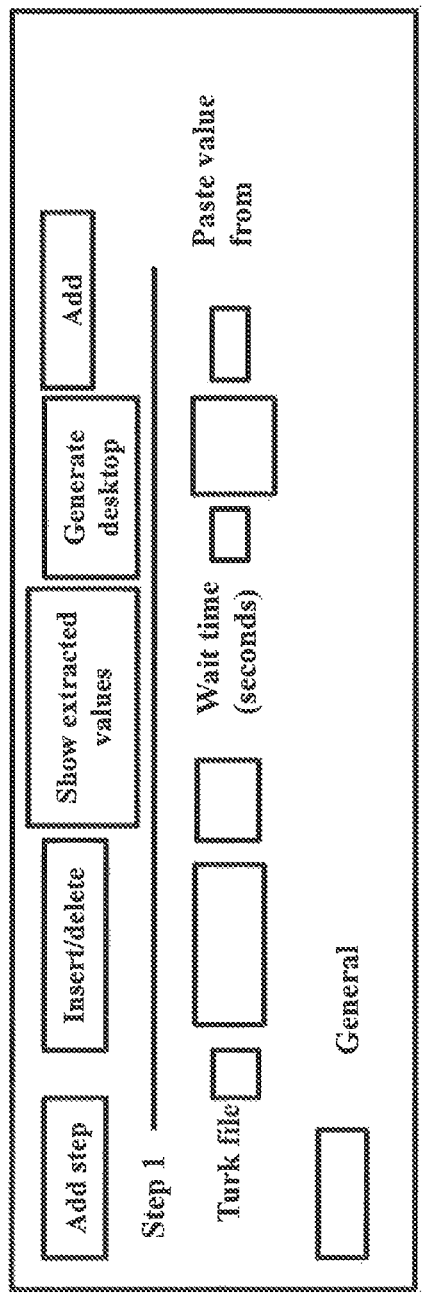
FIG. 3b depicts a screenshot displaying the generate desktop icon, according to the embodiments as disclosed herein.

FIG. 3b depicts a screenshot displaying the generate desktop icons, according to the embodiments as disclosed herein.

As depicted in FIG. 3b, the "generate desktop icons" creates the shortcuts of the configurations and pins it to a taskbar so that a user can run the command through one or more shortcut keys or by clicking on it. The following steps have to be followed to generate desktop icons such as a) Open shortcut.txt command located in a folder named as Navigator. Enter Name of configuration file, short cut key, configuration number, such as first, ctrl+Alt+1, wherein, first indicates the name of a first configuration, ctrl+alt+1 depicts a shortcut key, and 1 depicts a configuration number.

b) The user must click on the "generate desktop icons" button.

Figure 3C:
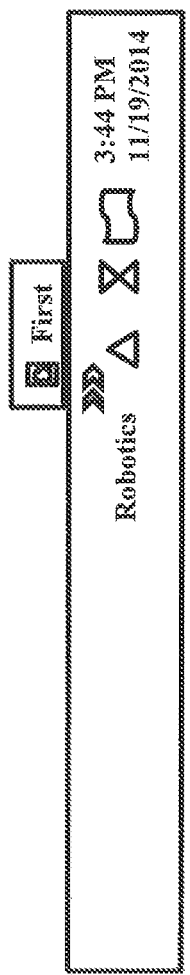
FIGS. 3c and 3d depicts a screenshot displaying the taskbar icon and shortcut creation notification window respectively, according to the embodiments as disclosed herein.
Figure 3D:
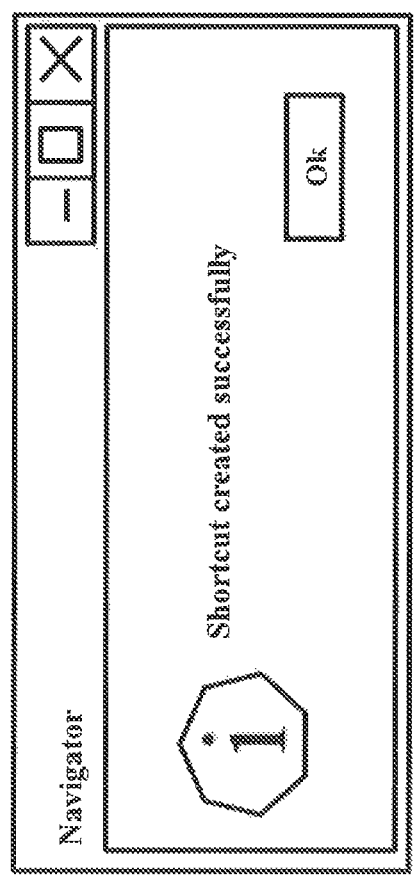

FIG. 3c depicts a screenshot displaying the taskbar icon, according to the embodiments as disclosed herein.

As depicted in FIG. 3c, the user creates the taskbar icon with the name "Robotics" and creates shortcuts of all configurations mentioned in the shortcut.txt and shows notification pop up.

Referring back to FIG. 3b, the add taskbar icon captures one or more icons in the taskbar which helps in the validation of checking whether the application has closed or relocated. The process automation system 100 aborts the execution when a change of location is found. An adjust taskbar icon (not shown in Figure) helps in the validation to check whether a plurality of applications have been closed or relocated. Further, an exception validation command handles a plurality of validations such as a CITRIX® disconnection, virus definition pop ups and so on. The exception validation command is activated by configuring the following steps:

a) Clicking on an exception validation button.

b) Capturing the start and end position coordinates of the image which comes as a pop-up such as for example, the CITRIX® disconnection pop-up location.

c) Entering the name of image with which one saves the image.

d) Running the configuration

When the process automation system 100 runs a configuration, the process automation system 100 checks for an image at a specified location frequently. When image CIT- RIX® disconnection/virus definition pop up appears, then the process automation system 100 waits for a specified time until the pop up disappears. At this point, the execution is either continued or discontinued.

Figure 4A:
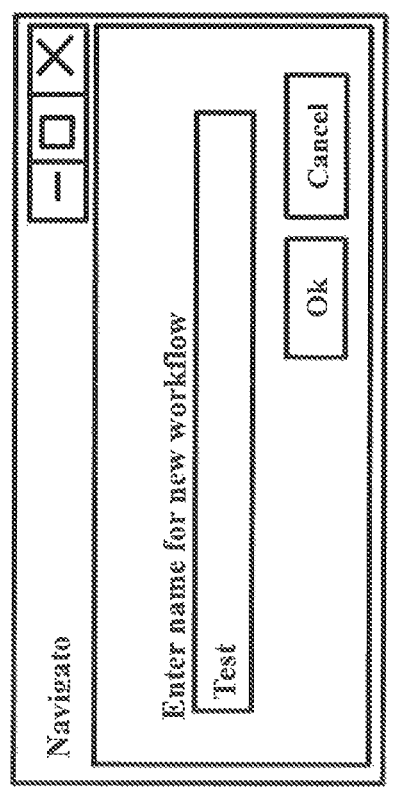
FIGS. 4a through 4c, depicts various shortcuts for workflow configuration in the process automation system of FIG. 1, according to the embodiments as disclosed herein.
Figure 4B:
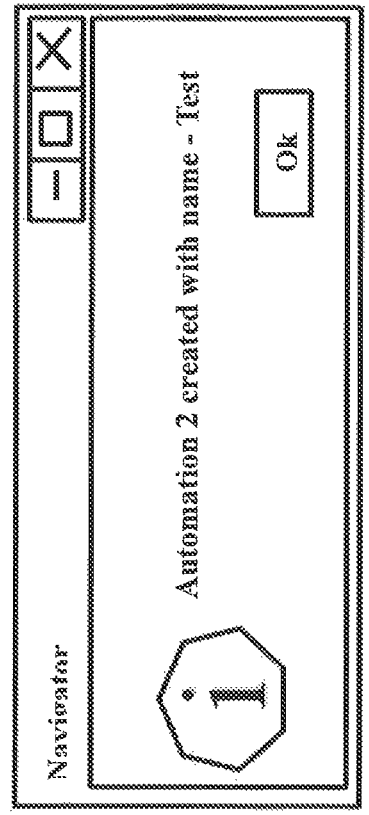
Figure 4C:
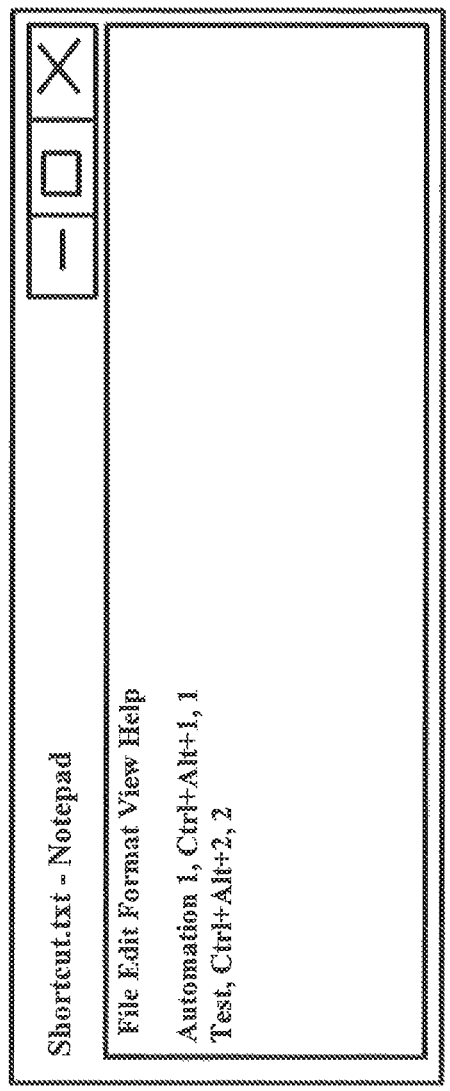

FIGS. 4a through 4c, depict various shortcuts for workflow configuration in the process automation system 100 of FIG. 1, according to the embodiments as disclosed herein. As depicted in FIG. 4a, a new automation recording is created and when a user tries to configure in a first recording, a second recording is automatically created. Once the name of the recording is created as shown in FIG. 4a, a second automation recording is created and the name entered is automatically added in the shortcut.txt. FIG. 4b depicts that an automation is created while FIG. 4c depicts that the name entered is automatically added in shortcut.txt.

Figure 5A:
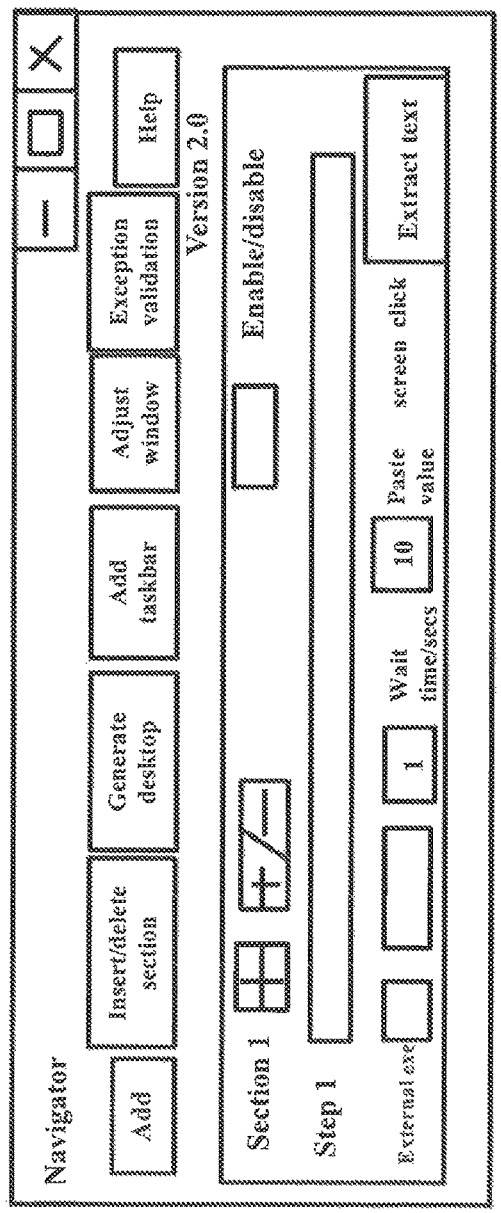
FIGS. 5a through 5f depict screenshots of various configuration features of the process automation system of FIG. 1, according to the embodiments as disclosed herein.

FIG. 5a through 5f depict screenshots of various configuration features of the process automation system 100 of FIG. 1, according to the embodiments as disclosed herein. As depicted in FIG. 5a, the smart wait feature in the process automation system 100 captures part of the screen for which the process automation system 100 needs to wait for a predefined period of time before performing any operation. The process automation system 100 may wait for a browser such as an internet explorer to open. The following steps are used to configure smart wait:
   a) Clicking on the on screen button
   b) Capturing co-ordinates that are a part of the screen for which the process automation system 100 waits until it is loaded.

Figure 5B:
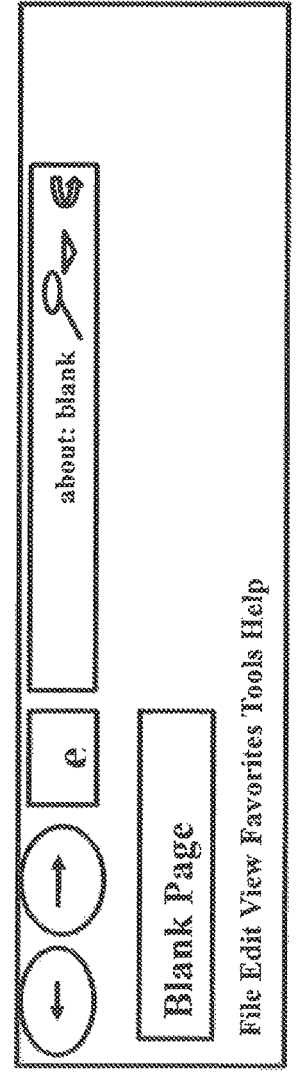

For example, the internet browser icon can be captured as shown in FIG. 5b, wherein the image is captured and saved in multiple steps folder of the process automation system 100. The process automation system 100 waits for the browser to load as mentioned in the smart wait feature. If the image appears before the wait time, the execution continues and therefore may not wait till the wait time mentioned.

Figure 5C:
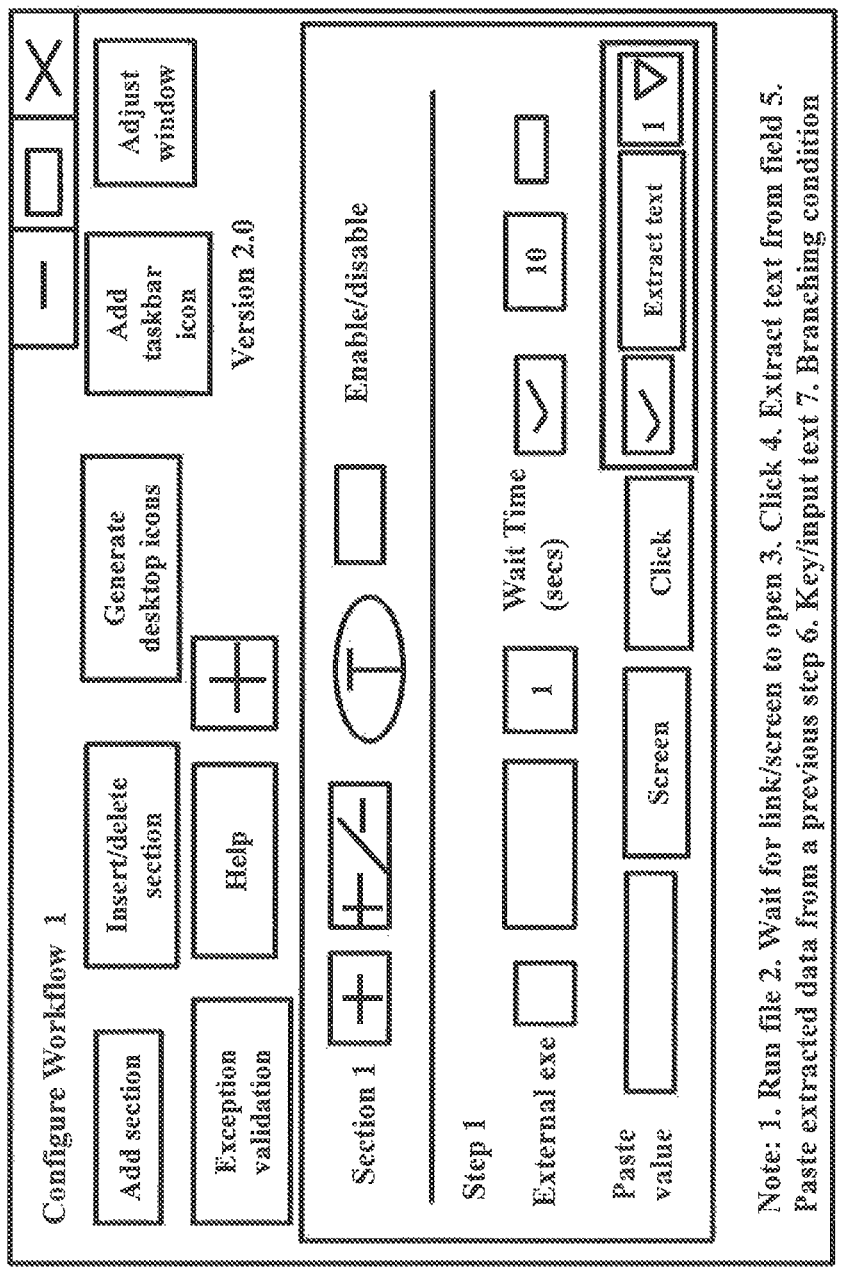

In an embodiment, the branching mechanism as depicted in FIG. 5c helps to navigate to another recording from a current recording based on a conditional mechanism. The condition can be given based on values extracted from specific locations or from the copied value. By clicking on the check box before extract field option and by clicking on the extract field button, an extract text option appears.

Figure 5D:
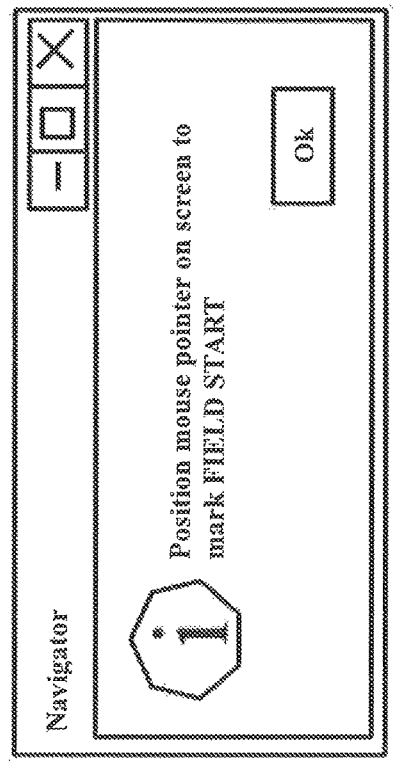
Figure 5E:
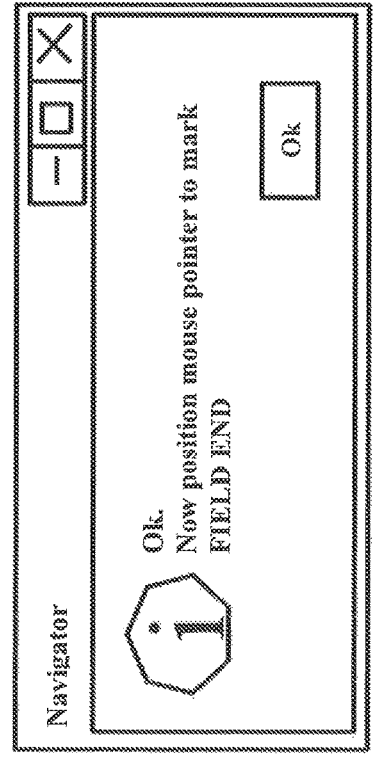
Figure 5F:
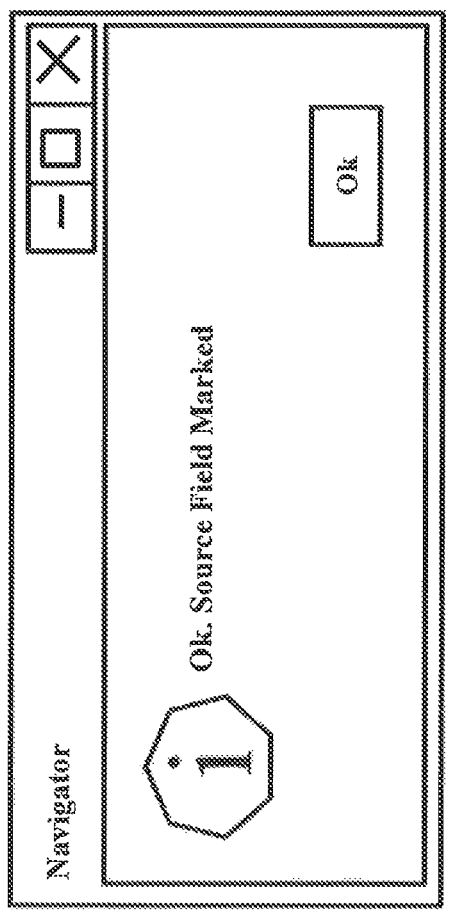

FIG. 5d shows a pop-up button to help locate the mouse pointer to the start position of the area for capturing text portions and space bar options. After capturing start position, a plurality of pop-ups to capture end position appears and thereby the process automation system 100 locates the mouse pointer to the end position of the area in order to capture text and press space bar.

Figure 6A:
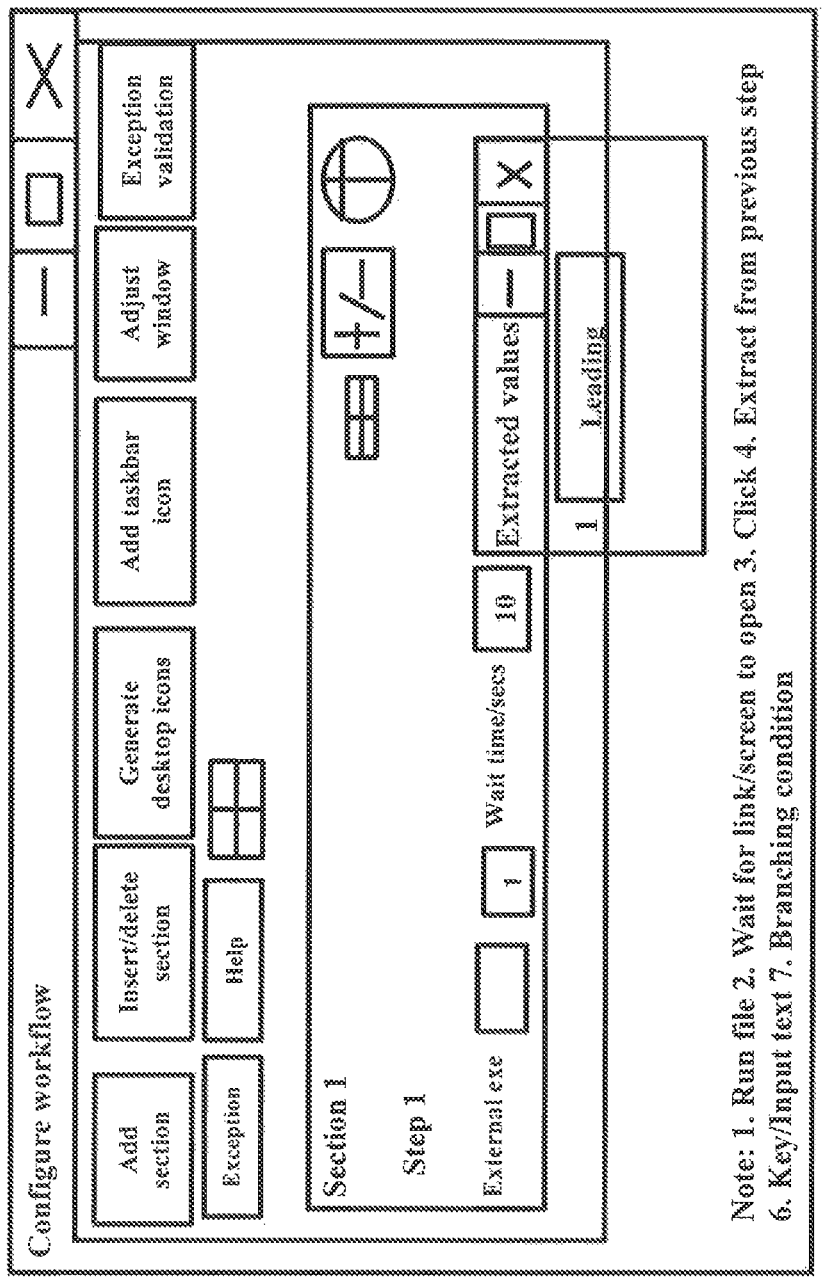
FIGS. 6a through 6h depict a plurality of screenshots that depict notification pop-ups of the process automation system of FIG. 1, according to the embodiments as disclosed herein.
Figure 6B:
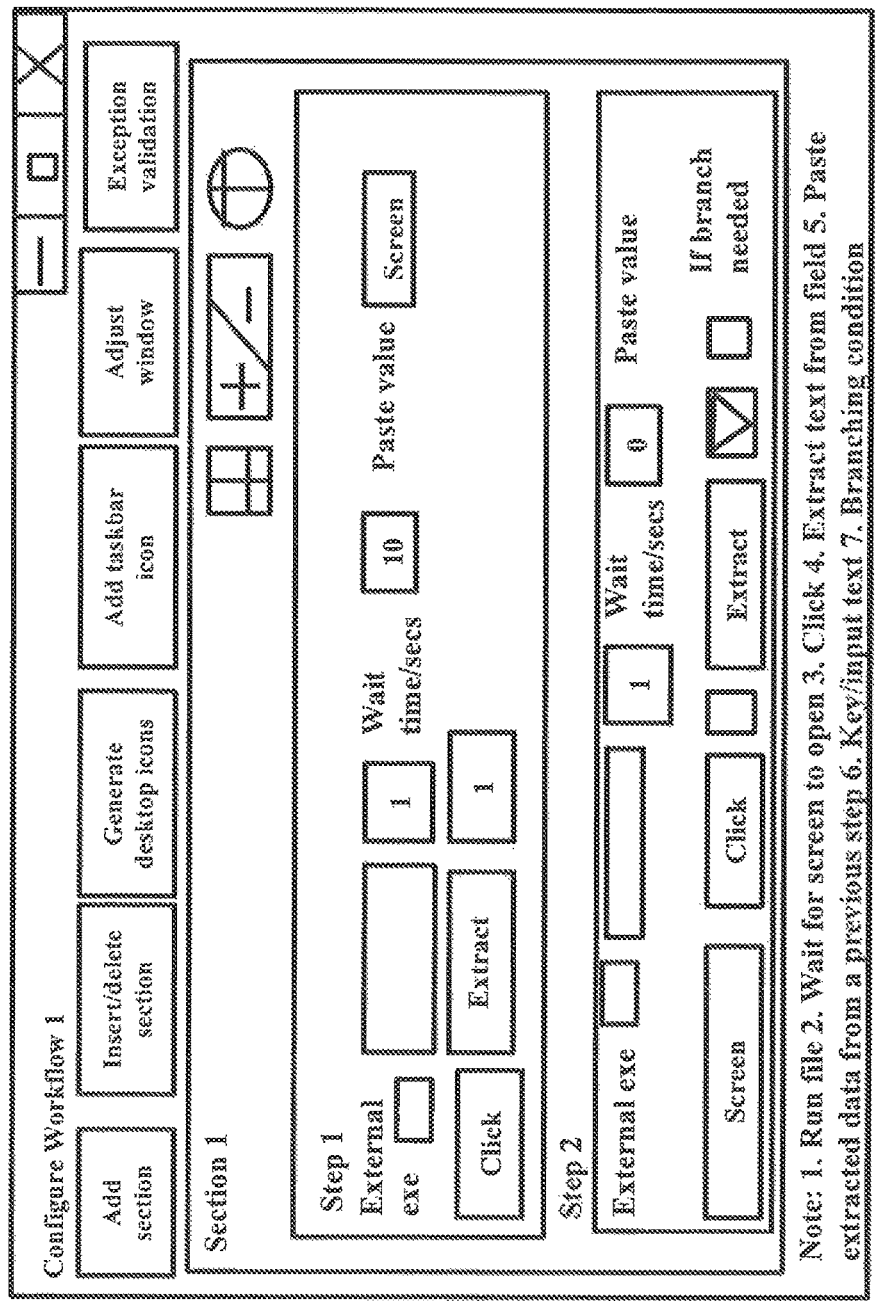
Figure 6C:
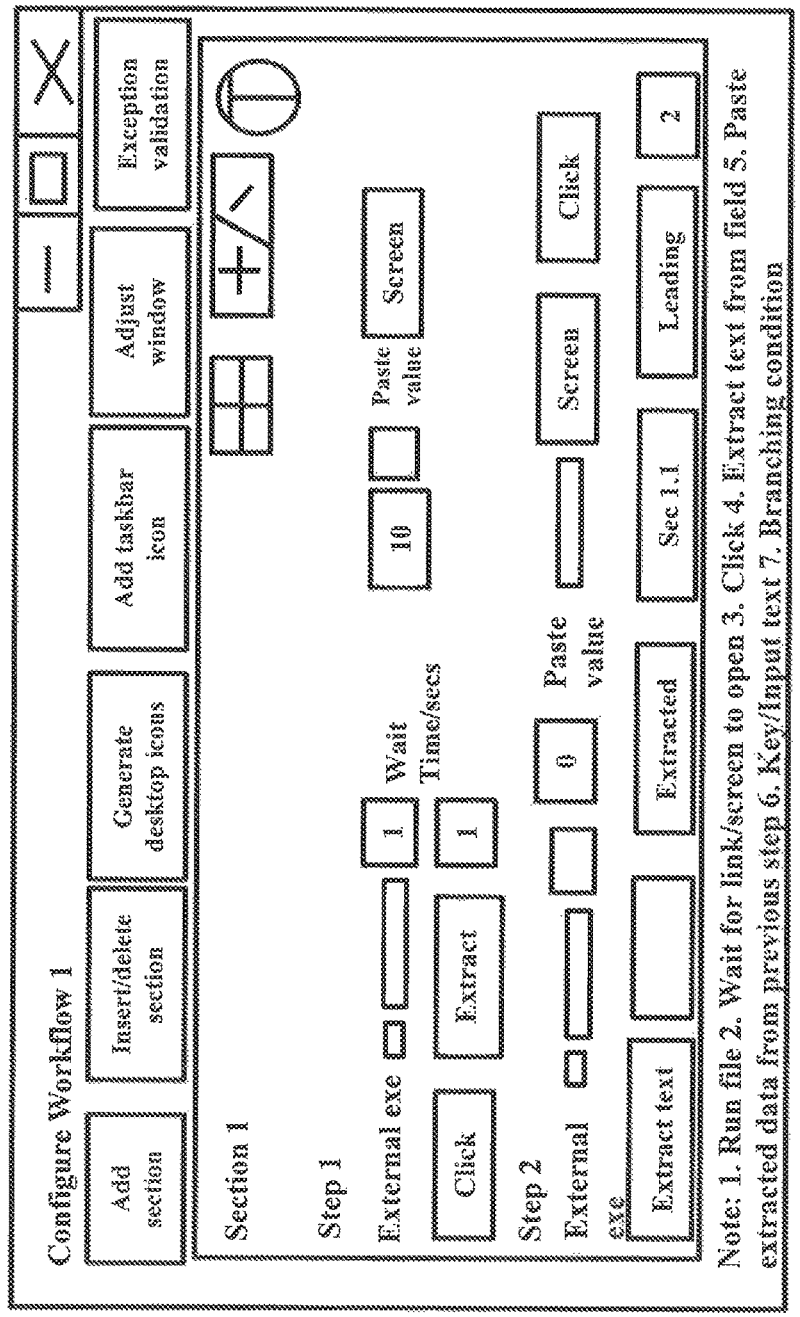

FIG. 6a through 6h depict a plurality of screenshots that depict notification pop-ups of the process automation system 100 of FIG. 1, according to the embodiments as disclosed herein. As depicted in FIG. 6a, an extracted value is compared with the user mentioned value and the recordings specified can be played if the user mentioned values matches the condition. FIG. 6b depicts different check boxes showing selected extracted value, sections and step numbers from where different values are extracted. Once the value that needs to be compared with is entered with the recording number to be played when both the values match. FIG. 6c depicts the configure workflow options to indicate text against which one wants to compare extracted or copies value. For example: on execution, the extracted value "leading" is compared with the value entered as "leading". Since in this case, both the values match when a second recording is played.

Figure 6D:
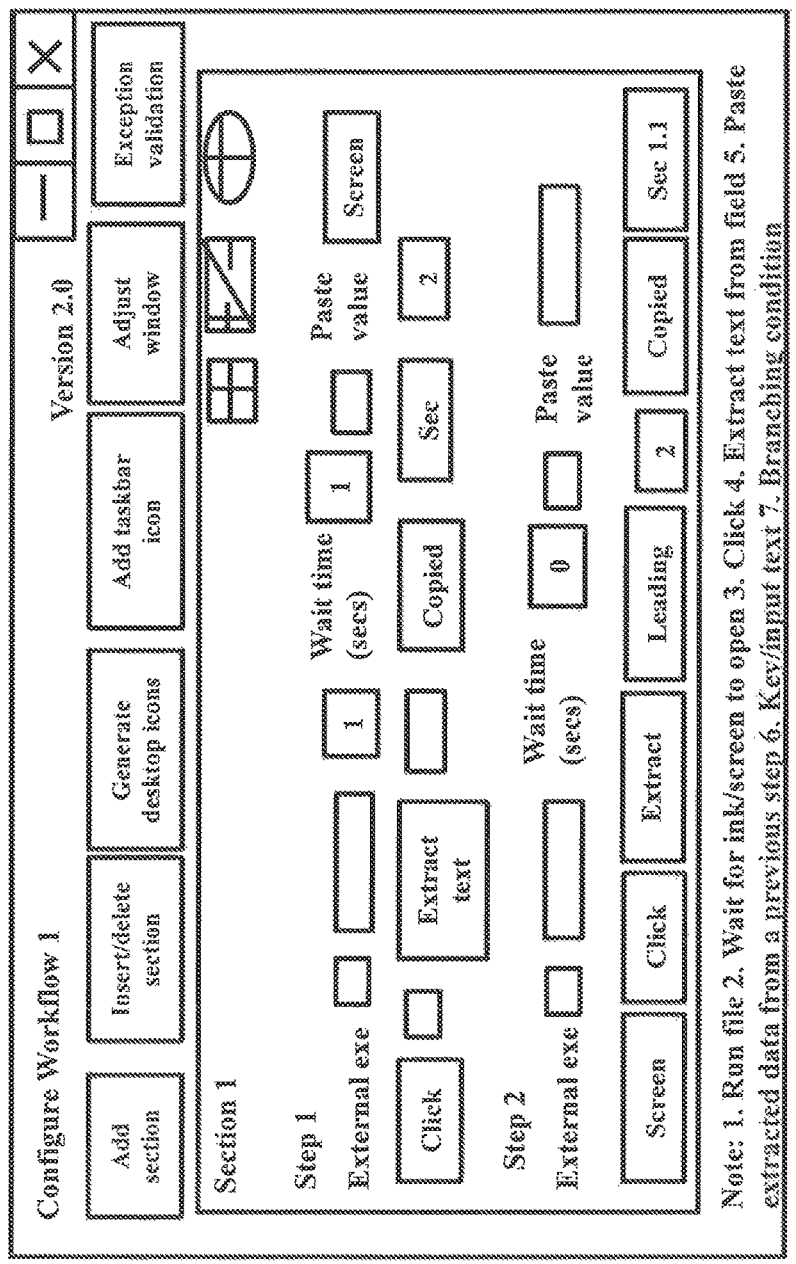

FIG. 6d depicts copy branching operations in various steps such as select copied from break down, selecting the section number and step number from where the user wants to use the copied value to be compared with and selecting the recording number which has to be played when both values match.

Run multiple configurations as a sequence:

To run multiple configurations, the following steps need to be followed:
   a) Add playlist1. Txt in list executor folder of navigator, users can add multiple playlists.
   b) Writing location of navigator exe, configuration number, number of timed recordings that has to be played. For example:
      C:\Users\Desktop\Navigator\Navigator.exe\, 2, 5.

Figure 6E:
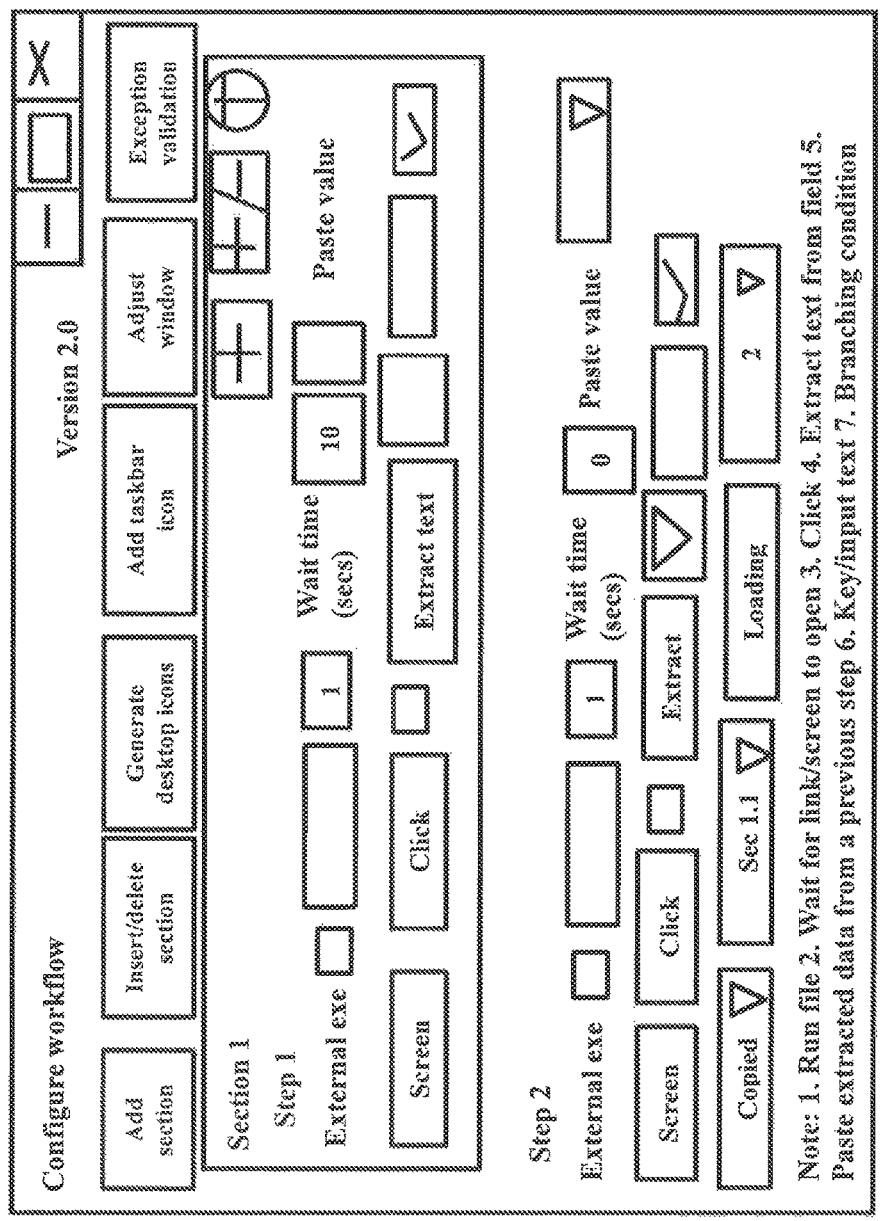

The user runs configuration for 2 to 5 times and sets the configuration mode as run and then running the list executor execution file which is located in the navigator folder. As depicted in FIG. 6e, the drag drop features enter a "drag drop" feature in the key/input textbox and the extract field button changes to the drag drop button, checking drag drop checkbox and then clicking on the drag drop button. Finally, the pop up appears where the location of the mouse pointer is indicated to the start position of the area that one wants to drag and press the space bar position.

Figure 6F:
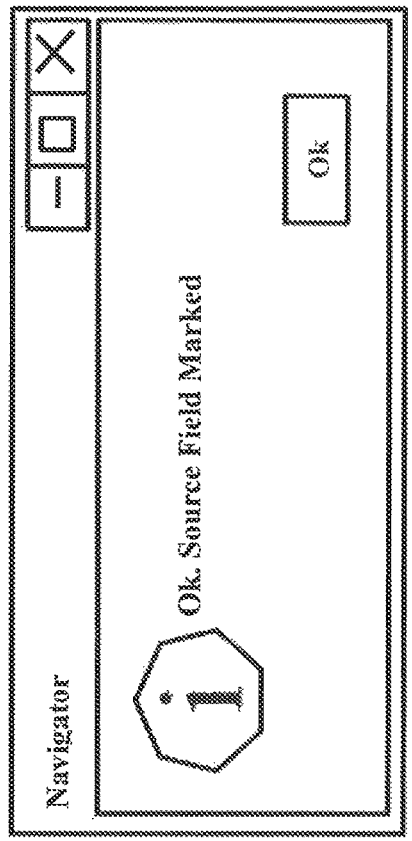
Figure 6G:
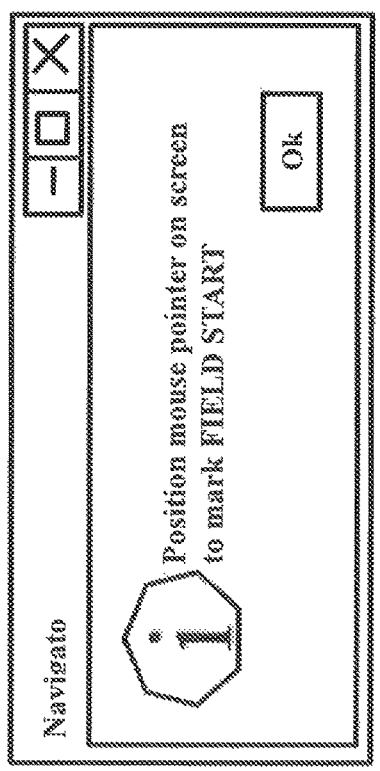
Figure 6H:
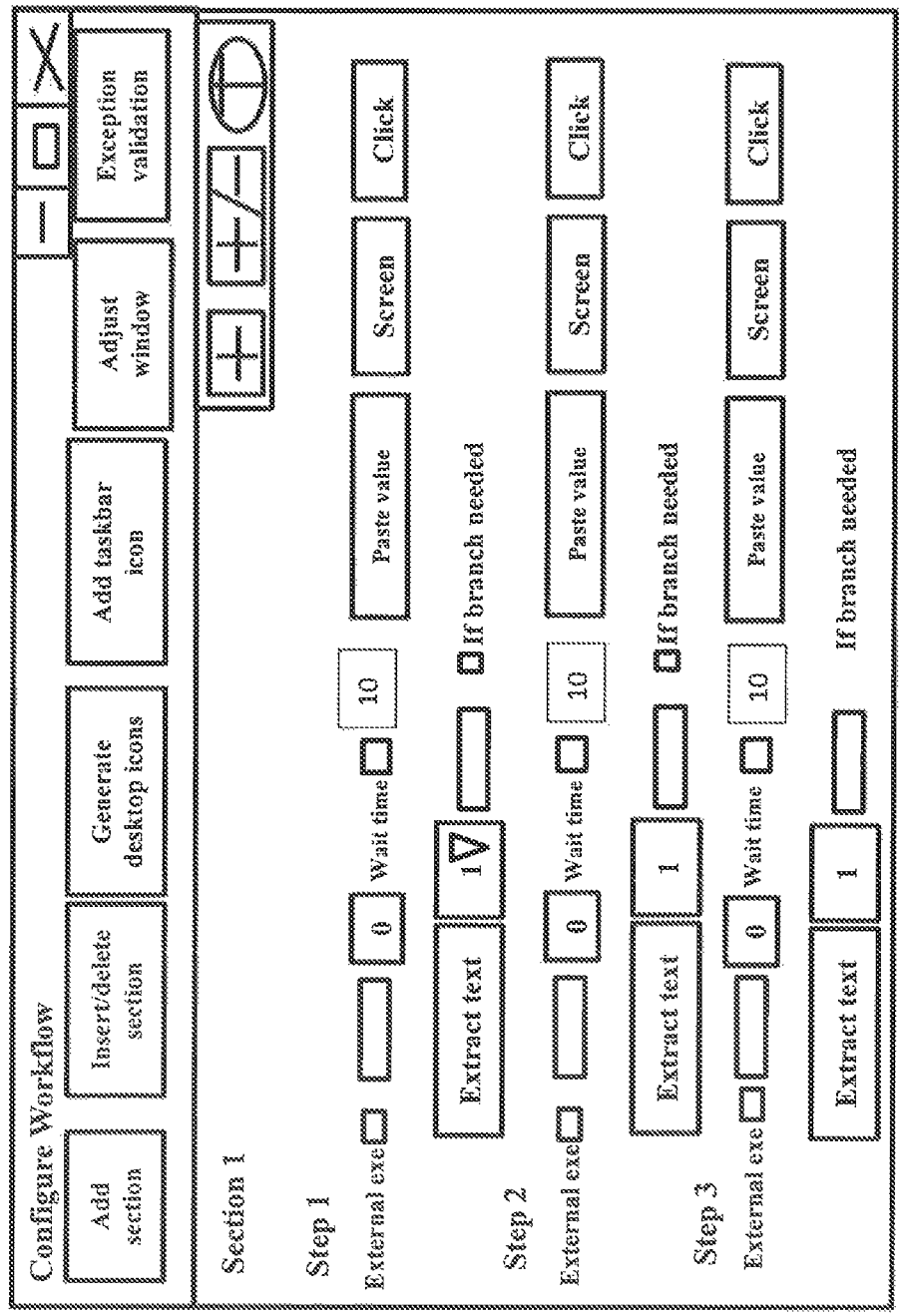

As depicted in FIGS. 6f and 6g, the position of mouse pointers are indicated to mark FIELD START (such as a start field) and FIELD END (such as an end field). After capturing start position, the process automation system 100 locates the mouse pointer to the end position of the area to drop and press space bar positions. After correct configuration, a correct pop up box that indicates a notification pop up.

In summary, the add section feature adds a new section from which configuration of multiple steps of process can be performed. The insert/delete sections helps to edit the section which makes configuring user friendly by providing the user flexibility to insert or delete the sections in between a sequence of actions. The "generate desktop icons" feature creates the shortcut of the configurations and then pins it to the taskbar so that the user can run through the shortcut key or by clicking on the "generate" desktop icon. For example, the add taskbar icon captures the icons in the taskbar which helps in validating to check whether the application has closed or has re-located. The process automation system 100 aborts the execution upon finding a change in location. An adjust window option changes the current window size to standard size and an exception validation handles validations such as CITRIX® disconnections, virus definition pop-ups and so on.

Consider an example, where a report to prepare inventory and sales data is extracted manually. Firstly, each department is grouped into several classes and sub classes which are sent as an input. A computer operator performs the following steps manually to extract data and save the report. The steps performed by computer operator are as follows:
   Logging into a Mystore/SAP® tools via CITRIX®.
   Enter inputs from an input excel sheet which is located in a local computing unit.
   Extracting data
   Exporting data into the excel sheet and saving it in a CITRIX® location.
   Consolidate class and subclass report for each department which requires substantial effort and time as each excel sheet needs to be opened and merged into a single excel sheet.

The above mentioned process is time consuming and is manually and computationally intensive. If the above mentioned process is performed by the process automation system 100, then the process does not require any manual operator and can be completely automated.

Figure 7:
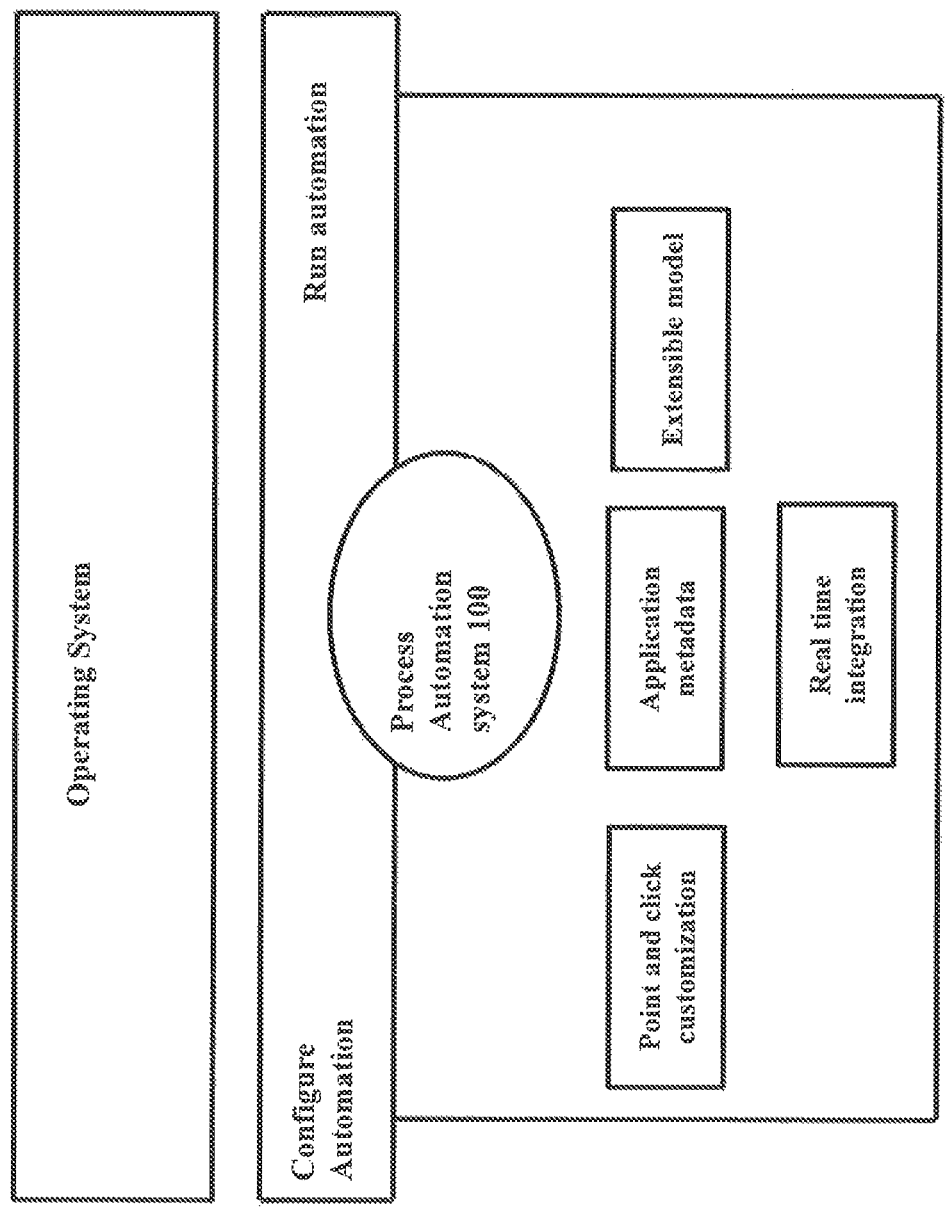
FIG. 7 depicts the computing architecture of the process automation system of FIG. 1, according to the embodiments as disclosed herein.

FIG. 7 depicts the computing architecture of the process automation system, according to the embodiments as disclosed herein. As depicted in FIG. 7, the process automation system 100 is a robotic automation ARM component which is used to improve the efficiency and accuracy of (repetitive) tasks performed by the user. The process automation system 100 applies an approach of workflow generation to capture, configure the automation specifications and used for automation within windows, web, SAP®, Citrix®, Mainframe®, and so on. The process automation system 100 uses point and click customization, extensible model, and real time integration. Third party application integration, mouse Phase 1 (Inventory data extraction):
1. The Navigator robo takes inputs from the input excel sheet which is located in the local system and accesses SAP® application from Citrix system and extracts the sales/inventory data and then saves the data as an excel sheet in the Citrix system. The merge robot function which is the brain robo component consolidates class and sub class data in excel sheets into a consolidated excel sheet for each department. Finally, all temporary files are deleted.
2. In an example, a standard excel template is designed with following fields such as customer code, quantity, work code, PDR number, originator, allocation code, customer order, number, exchange rate outstation code, and price type. The standard excel template is depicted in the following figure:

| Cust_Code | CCIF | CSDP | Qty | Work Code | PDR No | Orig | Alloc | Cust Order | Exchange Rate | Price Type | Mainframe_Order |
|---|---|---|---|---|---|---|---|---|---|---|---|
| C3600 | A84 | 525 | 118 | 20 | 52033 | W | 1 | 25189/22 | 88 | 12 | 6/203145 |
| C3600 | A70 | 525 | 60 | 20 | 522261 | W | 1 | 47537/22 | 88 | 12 | 6/203146 |
| C3600 | A70 | 525 | 148 | 20 | 517286 | W | 1 | 47269/22 | 88 | 12 | 6/203147 |
| C3600 | A70 | 525 | 50 | 20 | 482452 | W | 1 | 47576/22 | 88 | 12 | 6/203148 |
| C3600 | A70 | 525 | 48 | 20 | 520949 | W | 1 | 25163/21 | 88 | 12 | 6/203149 |
| C3600 | A70 | 525 | 70 | 20 | 493498 | W | 1 | 51167/21 | 88 | 12 | 6/203150 |
| C3600 | A70 | 525 | 16 | 20 | 506760 | W | 1 | 25060/14 | 88 | 12 | 6/203151 | operations, smart wait operation, visual interaction, pasting extraction, keyboard activities, branching and redirection are few of the operations that are performed by the process automation system 100.

Figure 8:
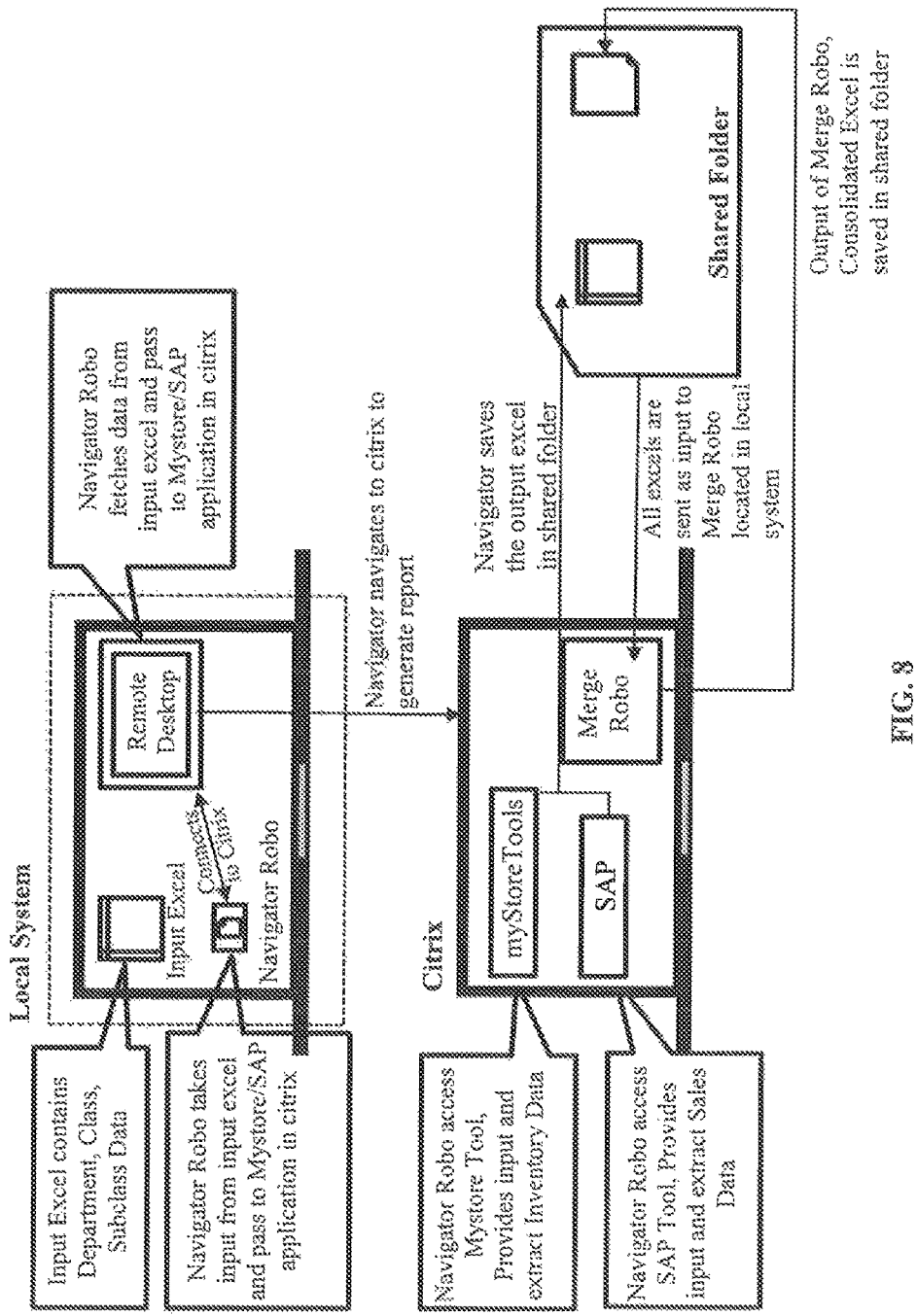
FIG. 8 depicts an exemplary automated solution approach of the process automation system of FIG. 1, according to the embodiments as disclosed herein.

FIG. 8 depicts an exemplary automated solution approach of the process automation system, according to the embodiments as disclosed herein. As depicted in FIG. 8, there can be a local system and a Citrix® system wherein the process automation system 100 alternatively referred to herein as a Navigator robo fetches data from an input excel sheet and then passes to a mystore/SAP® application in the Citrix® system. The input excel sheet includes department class data and subclass data and from there on the Navigator robo obtains multiple inputs from the input excel sheet and passes to Mystore/SAP® application in the Citrix® system. Further, the Navigator robo accesses Mystore tool, provides inputs and extracts inventory data from the Citrix® system and then accesses the SAP® tool, provides inputs and extract sales data. From the shared folder as depicted in FIG. 8, all excel sheets are sent as an input to a merge robo located in the local system. The input excel sheet (standard excel templates) mainly comprises codes for departments, classes, and sub classes which are supposed to be fed as an input to the Mystore/SAP® application.

The Navigator robo which is residing inside the local system obtains inputs from the excel sheet and passes the inputs to the Mystore application in order to extract respective department, class and subclass data in excel formats. Once the data is loaded in the Mystore application, the Navigator robo exports it in one or more formats (e.g., an excel format) and saves it to the Citrix® shared location. After a data extraction phase is completed, a brain/Artificial intelligence component in the Navigator robo is executed and run. The brain/Artificial intelligence component takes input in the form of excel sheets at Citrix® shared locations and processes these excel sheets to create a plurality of department wise excel sheets.

The entire automation process of the process automation system 100 is divided into two main phases such as The process automation system 100 is run in a dedicated desktop and reads the entire row by copying all details in a row for each order by pasting the details into a mainframe in the respective tabs to generate the Mainframe order. Once the order number is generated, the same order is copied from the mainframe and pasted in the respective row. The process automation system 100 moves to subsequent rows and then completes the order generation for the entire sheet.

The process automation system 100 is capable of mimicking certain user activities and making use of smart wait time features that handles system latency and network issues while executing processes. A single tool is used for automation and interfacing with a plurality of environments such as windows, web, SAP®, Citrix, interface, and mainframe. The process automation system 100 allows workflow generation for automation of user activities on operating systems such as windows OS and then works with a plurality of platforms, environments, and applications such as windows, web, .net, Java, SAP®, Citrix®, VDI (Virtual Desktop Infrastructure), mainframe and more. The process automation system 100 also supports handling of runtime environment exceptions and audit logs.

Further, the process automation system 100 supports interfacing of command line interfaces, batch run interfaces, and menu like interfaces for running automations. Additionally, internal and embedded documentation of processes and unit level control on automation is supported. The process automation system 100 acts as a mouse action imitator by imitating and automating certain mouse operations such as click, double click, right click, and so on.

The process automation system 100 facilitates embedded/an in-line documentation and automates multiple copy/multiple paste options by allowing the user to facilitate continuous and multiple copying of a plurality of values. The exception handling feature in the process automation system 100 supports environmental exception handling such as waiting until a screen appears (for example: Citrix® disconnection screen or temporary pop-up) or waiting until a screen appears (for example: web page load).

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A computer implemented system for intelligently automating a plurality of computing tasks, comprising:
    a memory storing instructions, and a process automation system;
    a hardware processor coupled to said memory, wherein said hardware processor is configured by said instructions to:
    receive a plurality of data inputs, wherein said process automation system segregates the plurality of data inputs based on a predetermined criteria to mash up and transfer data from a first application screen to a second application screen,
    obtain a plurality of records based on said segregated plurality of data inputs, wherein said process automation system obtains a first set of records from a first file to write the first set of records on an individual basis and subsequently skips to a second set of records, wherein said first set of records are initially screened by the process automation system to dynamically select a target screen on said second application screen,
    apply a workflow generation mechanism based on said segregated plurality of data inputs to configure a plurality of specifications by using point and click customization, an extensible model, and real time integration, wherein said workflow generation mechanism deciphers said first set of records on said second application screen to match an intended value field, and
    execute the plurality of specifications based on said plurality of data inputs, wherein said process automation system waits for a specified period of time based on a set of incoming data to determine continuation and discontinuation of an execution of said plurality of specifications, wherein a plurality of configurable steps in the process automation system are modified to prevent re-recording of an entire operation, wherein said process automation system shifts to a visual mode during a test run from an non-UI mode in a production run,
    wherein the process automation system mimics user activities, uses wait time features that handle system latency and network issues while executing processes, and handles runtime environment exceptions and audit logs.

2. The computer implemented system as claimed in claim 1, wherein said plurality of specifications are configured during a configuration phase of the workflow generation mechanism.

3. The computer implemented system as claimed in claim 1, wherein said process automation system automatically configures a plurality of shortcuts for said plurality of records.

4. The computer implemented system as claimed in claim 1, wherein said process automation system creates an error log for each automation run during a batch process.

5. The computer implemented system as claimed in claim 1, wherein said process automation system facilitates a user to insert the plurality of configuration steps from at least one location of a computing device in between a sequence of actions.

6. The computer implemented system as claimed in claim 1, wherein said process automation system facilitates displaying at least one current section number and a number of steps option to enter a secondary step number.

7. The computer implemented system as claimed in claim 1, wherein said process automation system displays an extracted text portion when an extracted text button is clicked.

8. The computer implemented system as claimed in claim 1, wherein said process automation system generates a plurality of desktop icons to create a plurality of configuration shortcuts.

9. The computer implemented system as claimed in claim 1, wherein said process automation system captures a plurality of icons in a taskbar to validate closing and relocating of a plurality of applications, wherein the process automation system aborts the execution when a change in location is found.

10. The computer implemented system as claimed in claim 1, wherein said process automation system checks for at least one image at a specified location to decide whether to continue or discontinue execution of a pre-determined file.

11. The computer implemented system as claimed in claim 1, wherein said process automation system captures a highlighted area from the target screen to decipher and compare an intended value, so that said intended value is read as a captioned field.

* * * * *